(12) United States Patent
Grundig

(10) Patent No.: US 8,132,532 B1
(45) Date of Patent: Mar. 13, 2012

(54) APPARATUS AND METHOD FOR INHIBITING THE GROWTH OF ALGAE IN AN AQUARIUM

(76) Inventor: Kevin J. Grundig, Middletown, NY (US)

( * ) Notice: Subject to any disclaimer, the term of this patent is extended or adjusted under 35 U.S.C. 154(b) by 334 days.

(21) Appl. No.: 12/537,721

(22) Filed: Aug. 7, 2009

(51) Int. Cl.
*A01K 63/00* (2006.01)
(52) U.S. Cl. .......................... 119/245; 119/265
(58) Field of Classification Search .......... 119/245, 119/246, 253, 265; 135/126, 128, 117
See application file for complete search history.

(56) References Cited

U.S. PATENT DOCUMENTS

| | | | |
|---|---|---|---|
| 290,838 A | 12/1883 | Bishop | |
| 3,234,905 A | 2/1966 | Olson | |
| 3,733,758 A * | 5/1973 | Maier et al. | 52/113 |
| 3,810,482 A * | 5/1974 | Beavers | 135/147 |
| 4,632,138 A * | 12/1986 | Irwin | 135/143 |
| 5,040,486 A | 8/1991 | Pack | |
| 5,040,488 A | 8/1991 | Hwang | |
| 5,113,793 A | 5/1992 | Leader et al. | |
| 6,062,169 A | 5/2000 | Wade et al. | |
| 6,705,338 B2 * | 3/2004 | Zheng | 135/126 |
| D515,746 S | 2/2006 | Sequino | |
| 7,066,647 B2 * | 6/2006 | Peska | 383/40 |
| D533,972 S | 12/2006 | La Luzerne | |
| 7,673,584 B2 * | 3/2010 | Aley | 119/161 |
| 2006/0102084 A1 * | 5/2006 | Garfield | 119/165 |
| 2008/0060585 A1 * | 3/2008 | Garfield | 119/165 |
| 2009/0050064 A1 * | 2/2009 | Greene | 119/161 |

\* cited by examiner

*Primary Examiner* — Monica Williams
(74) *Attorney, Agent, or Firm* — Arthur Jacob

(57) ABSTRACT

An aquarium curtain is selectively deployed and placed over transparent walls of an aquarium to block the entry of ambient light from outside the aquarium, thereby inhibiting the growth of algae in the aquarium. The aquarium curtain includes a sheet of substantially opaque flexibly foldable material and a frame having frame members movable relative to one-another between a collapsed configuration in which the aquarium curtain is compact for handling and storage, and an erect configuration, in which the aquarium curtain is fastened in place over the aquarium to block entry into the aquarium of ambient light from outside the aquarium.

10 Claims, 3 Drawing Sheets

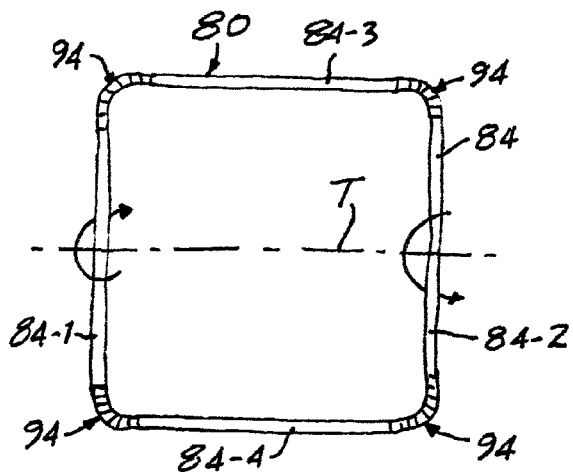
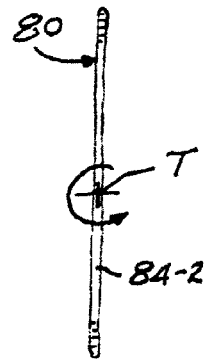
FIG. 7　　　　　　　　FIG. 8
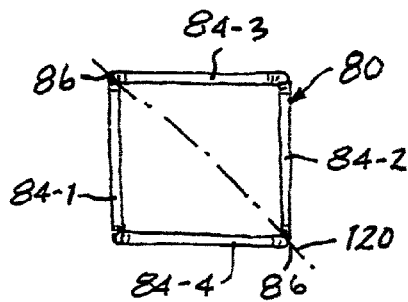
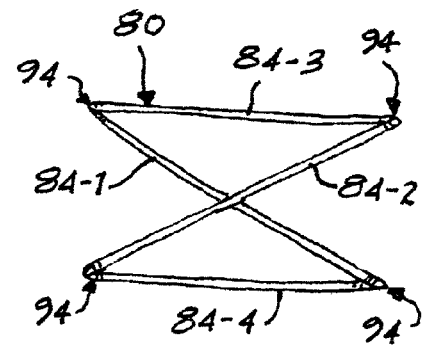
FIG. 9　　　　　　　　FIG. 10
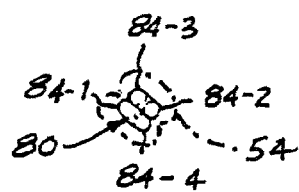
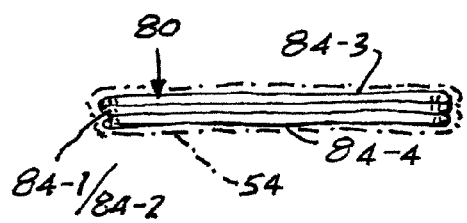
FIG. 11　　　　　　　　FIG. 12

APPARATUS AND METHOD FOR INHIBITING THE GROWTH OF ALGAE IN AN AQUARIUM

The present invention relates generally to the maintenance of aquariums and pertains, more specifically, to inhibiting the growth of algae in aquariums maintained in domestic and commercial settings.

Over the years, aquariums have gained increasing popularity in homes and in offices. While the presence of an aquarium can enhance a home or an office, regular care is required in order to maintain the appearance, as well as the viability, of the aquarium. One of the more challenging aspects of maintaining an aquarium is keeping the aquarium free of unwanted algae which can grow in the aquarium. One of the more popular methods for reducing the presence of algae in an aquarium is to include within the aquarium living creatures which feed upon the algae, thereby reducing the population of algae. Other methods include the incorporation of chemicals which can inhibit the growth of algae, and mechanical devices which can be used periodically to remove algae from an aquarium. The use of chemicals is undesirable, and can even be toxic to some inhabitants of an aquarium. Mechanical devices require that a person expend a finite amount of time cleaning away the unwanted algae, and that the various mechanical devices be employed with the care necessary to avoid damage to the aquarium or injury to the inhabitants of the aquarium. Moreover, the invasion of an aquarium by mechanical cleaning often will startle and disturb the inhabitants, sometimes with highly deleterious results.

By far, the best approach to solving the problem of algae in an aquarium is to avoid the growth of algae, and to do so without introducing into the aquarium potentially dangerous chemicals or disruptive mechanical devices. The present invention provides apparatus and method which inhibit the growth of algae in an aquarium, without introducing such chemicals or mechanical devices. As such, the present invention attains several objects and advantages, some of which are summarized as follows: Provides a simple and effective apparatus for inhibiting the growth and proliferation of algae in an aquarium, and does so without invading the aquarium itself; inhibits the growth of algae in an aquarium without startling or otherwise disturbing the inhabitants of the aquarium or exposing the inhabitants to dangerous, or even toxic, chemicals; requires only minimal time and effort to put into regular use for effectively inhibiting the growth of algae in an aquarium; provides a relatively simple and inexpensive apparatus which can be used conveniently in a method that requires no special tools or skills to accomplish the inhibition of algae growth in an aquarium; is adapted for ready and effective use in connection with a wide variety of aquariums placed in various settings; provides an apparatus which is stored easily when not in use and readily deployed for regular use in effectively inhibiting the growth of algae in an aquarium; provides a rugged apparatus of simplified construction capable of economical manufacture and exemplary performance over an extended service life.

The above objects and advantages, as well as further objects and advantages, are attained by the present invention, which may be described briefly as an aquarium curtain for selective deployment and placement over at least one wall of an aquarium having aquarium walls to block the entry of ambient light from outside the aquarium to inside the aquarium through a predetermined transparent area of the one wall, thereby inhibiting the growth of algae in the aquarium, the aquarium curtain comprising: a sheet of flexibly foldable material having a substantially opaque area complementary to the predetermined transparent area of the aquarium wall; a fare having frame members movable relative to one-another between a collapsed configuration and an erect configuration; a coupling arrangement coupling the frame with the sheet such that with the frame members in the collapsed configuration the sheet is folded into a compact form for handling and storage, and upon moving the frame members into the erect configuration, the sheet is deployed into a substantially planar form to establish a curtain panel in which the substantially opaque area is placed for juxtaposition with the predetermined transparent area of a corresponding wall of the aquarium; and at least one fastener on the curtain panel for selective attachment of the curtain panel to the aquarium in juxtaposition with the corresponding wall, with the substantially opaque area placed over the predetermined transparent area to block the entry of ambient light from outside the aquarium into the aquarium through the corresponding wall of the aquarium.

In addition, the present invention provides a method for inhibiting the growth of algae in an aquarium having aquarium walls, at least one of which aquarium walls includes a predetermined transparent area through which ambient light from outside the aquarium can enter inside the aquarium, the method comprising: providing a curtain panel having a substantially opaque area for juxtaposition with the predetermined transparent area of a corresponding wall of the aquarium; and selectively attaching the curtain panel in juxtaposition with the corresponding wall, with the substantially opaque area placed over the transparent area to block the entry of ambient light from outside the aquarium into the aquarium through the corresponding wall of the aquarium.

The invention will be understood more fully, while still further objects and advantages will become apparent, in the following detailed description of preferred embodiments of the invention illustrated in the accompanying drawing, in which:

FIGS. 7 through 12 are diagrammatic views illustrating the manner in which the aquarium curtain is collapsed for compact handling and storage.

Figure 1:
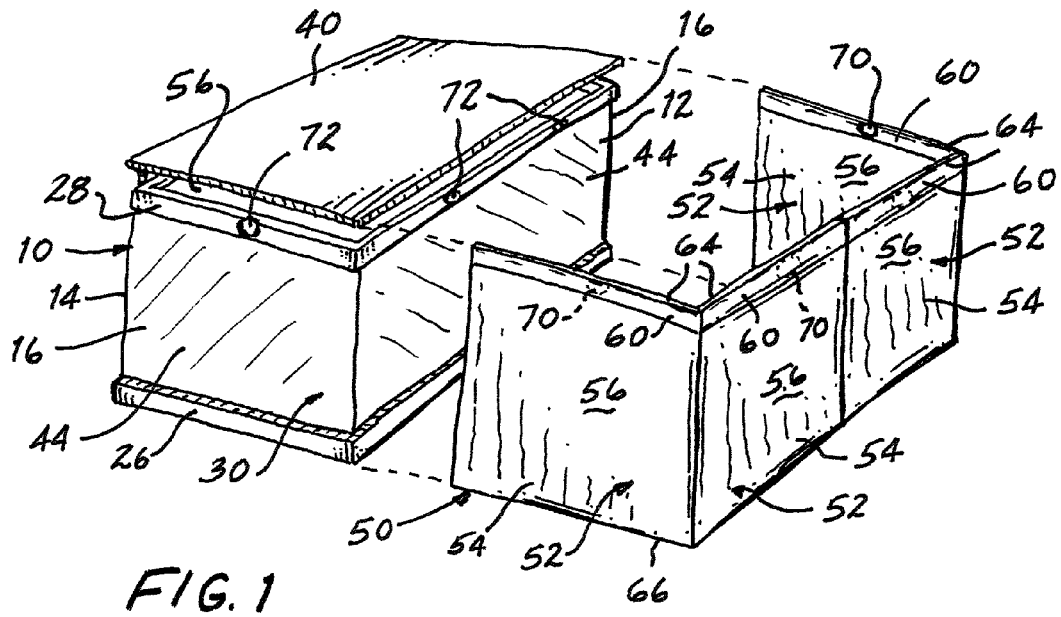
FIG. 1 is a pictorial perspective view showing an aquarium curtain constructed in accordance with the present invention being put into place upon an aquarium in accordance with a method of the present invention.
Figure 2:
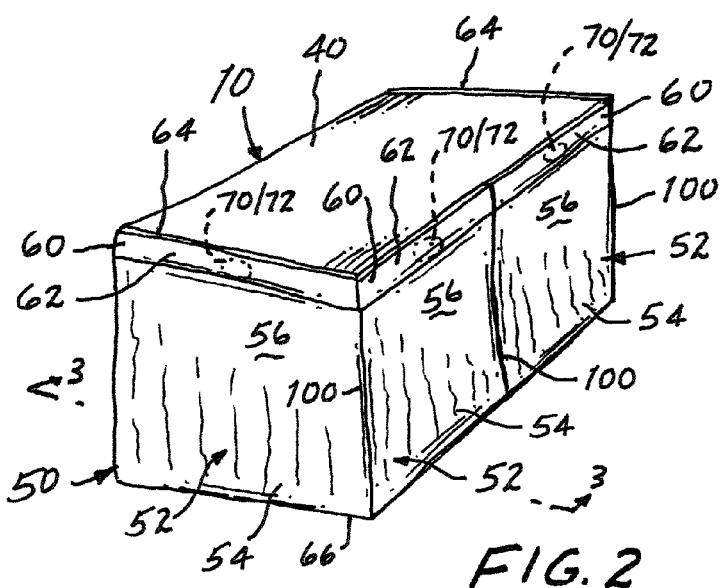
FIG. 2 is a pictorial perspective view similar to FIG. 1, and showing the aquarium curtain in place upon the aquarium.
Figure 3:
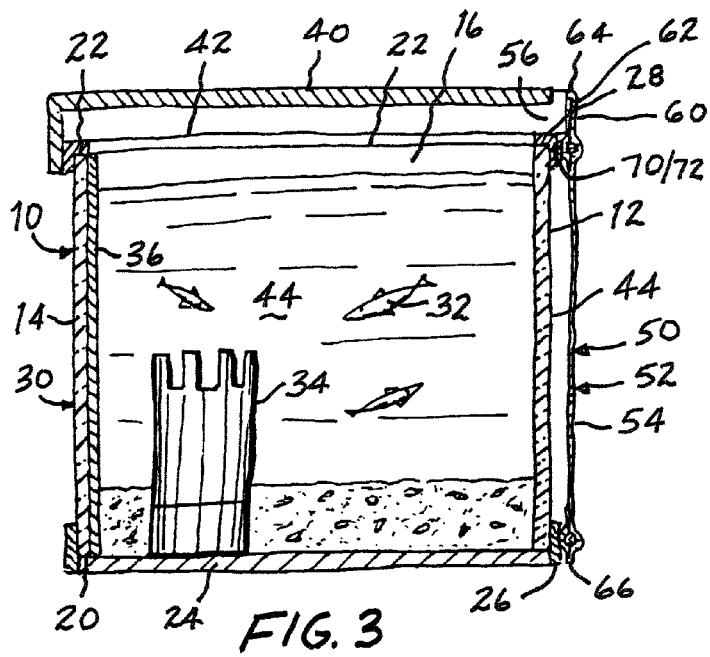
FIG. 3 is an enlarged cross-sectional view taken along line 3-3 of FIG. 2.

Referring now to the drawing, and especially to FIGS. 1 through 3 thereof, a typical aquarium is shown at 10 and is seen to include a front wall 12, a back wall 14 and opposite side walls 16 spaced apart in longitudinal directions, with the front wall 12 and the back wall 14 spaced apart laterally and extending longitudinally between the side walls 16. Each wall 12, 14 and 16 extends altitudinally between corresponding bottom and top edges 20 and 22, respectively. A bottom 24 is secured to the walls 12, 14 and 16, along bottom edges 20, by a lower rim 26, and a similar upper rim 28 extends along the top edges 22, around the perimeter of the aquarium 10.

Aquarium 10 is placed in a domestic setting, enhancing the appearance of a home and, as is conventional in the construction of such aquariums, walls 12, 14 and 16 are integrated within a generally tubular structure 30 which extends altitudinally between the bottom edges 20 and the top edges 22, the tubular structure 30 being constructed of a transparent material, such as glass or a synthetic polymeric material, having a rectangular transverse cross-sectional area for containing inhabitants, as well as a variety of accessory items, examples of which are shown in FIG. 3 at 32 and 34, respectively, to establish a community within the interior of the aquarium 10 and for displaying the community of inhabitants and accessory items through the front wall 12 and the side walls 16. In a usual arrangement, an opaque backdrop 36 is placed inside the aquarium 10, juxtaposed with the inside of back wall 14, to provide an aesthetically appealing scene behind the community contained within the aquarium 10. At the same time, backdrop 36 serves to hide various pieces of equipment, such as a water pump, an air pump and filters, all of which ordinarily are mounted outside the back wall 14, and none of which are shown here. A cover 40 is mounted above and closely adjacent to the top edges 22 and upper rim 28, and extends over the top 42 of aquarium 10, spaced slightly altitudinally above the top edges 22 and upper rim 28, in a conventional manner.

It is well known that the propagation and growth of algae in an aquarium is promoted by the presence of light entering the aquarium. It is quite common, then, that algae will tend to propagate and grow along the inside of walls 12 and 16 since ambient light from outside the aquarium 10 will pass through transparent areas 44 of walls 12 and 16 and promote growth along the inside of the walls 12 and 16. While the influx of ambient light into aquarium 10 through transparent areas 44 is not avoided during viewing of the community within the aquarium 10, there are extended periods of time, characterized as "down time", when viewing need not be made available such as, for example, when the home is not occupied during daytime working hours, or during vacation times, or at anytime a person or persons in the home decide that viewing is not essential. Accordingly, the present invention provides apparatus and method by which ambient light that ordinarily might enter from outside aquarium 10 to inside aquarium 10 through the transparent areas 44 provided by walls 12 and 16 is blocked, thereby inhibiting the propagation and growth of algae within the aquarium 10. To that end, the present invention includes apparatus shown in the form of an aquarium curtain 50 for selective deployment and placement over the walls 12 and 16 of the aquarium 10 to block the entry of ambient light into the aquarium 10 during "down times" and thereby inhibit the growth of algae within the aquarium in accordance with the method of the present invention.

Aquarium curtain 50 is seen to include a plurality of curtain panels 52, each of which curtain panels 52 is constructed, configured and dimensioned for selective deployment and placement over a corresponding transparent area 44 of a wall 12 or 16 in order to block ambient light from entering aquarium 10 through the corresponding transparent area 44, as will be described below. Thus, each curtain panel 52 includes a sheet 54 of flexibly foldable material having a substantially opaque area 56 complementary to the predetermined transparent area 44 of a corresponding wall 12 or 16 over which curtain panel 52 is to be placed. The preferred material for sheet 54 is an opaque fabric, such as nylon or a very durable light-weight opaque fabric known as parachute cloth. These materials have been found to exhibit suitable flexibility and light-blocking qualities, while providing sufficient resistance to the effects of light and water, and especially resistance to salt water which is present in some aquariums. Once the curtain panels 52 are deployed and placed over the walls 12 and 16, as illustrated in FIGS. 1 and 2, the opaque characteristics of the sheet 54 of each curtain panel 52 will block ambient light from entering aquarium 10 through walls 12 and 16 and thereby inhibit algae growth.

It is noted that opaque back panel 36 will preclude the entry of ambient light through back wall 14, and cover 40, which is constructed of an opaque material, blocks ambient light from entering aquarium 10 through the top 42. However, since cover 40 is spaced slightly above upper rim 28, there is a relatively small gap 57 between the cover 40 and the upper rim 28. In order to block ambient light from entering aquarium 10 through gap 57, that is, closely adjacent to and over the top edges 22 of the walls 12 and 16, each curtain panel 52 includes a barrier 60 which provides a supplemental substantially opaque area 62 extending altitudinally upwardly above upper edges 22 to block ambient light which otherwise could enter aquarium 10 through gap 57. Barrier 60 is integral with curtain panel 52, preferably formed as a unitary extension of sheet 54, extending adjacent the uppermost edge 64 of the curtain panel 52, altitudinally opposite a basal edge 66 of the curtain panel 52.

Each curtain panel 52 carries a fastener 70 which is engaged with a complementary fastener 72 on the upper rim 28 to secure the curtain panel 52 in place over a corresponding wall 12 or 16, as shown. In the preferred construction, fastener 70 is in the form of a magnet affixed to curtain panel 52 adjacent uppermost edge 64 of curtain panel 52, as by adhering the magnet to curtain panel 52. Complementary fastener 72 then is in the form of a plate affixed to upper rim 28, as by an adhesive, for registering with the magnet upon locating basal edge 66 of curtain panel 52 in juxtaposition with lower rim 26. Alternate fasteners 70 and 72 may be provided in the form of hook-and-loop fasteners (known as VELCRO fasteners), snaps, hooks and the like.

Figure 5:
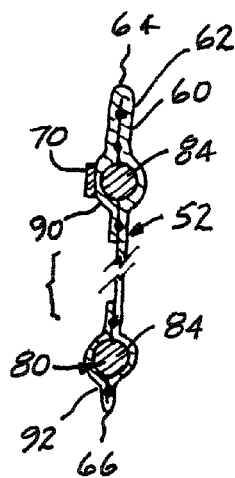
FIG. 5 is a cross-sectional view taken along line 5-5 of FIG. 4.
Figure 4:
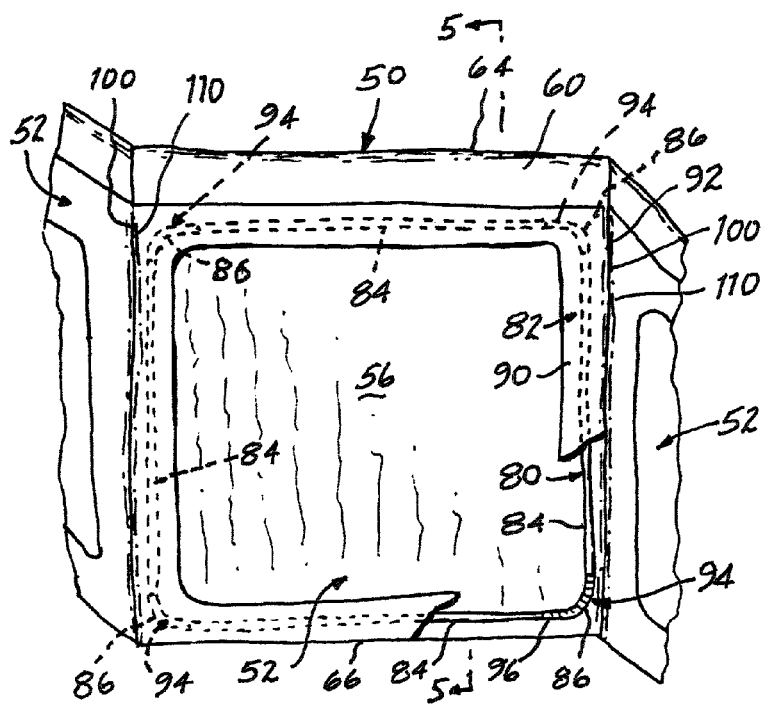
FIG. 4 is an elevational view, partially broken away to show component parts of the apparatus.

Turning now to FIGS. 4 and 5, each curtain panel 52 is seen to include a frame 80 coupled to sheet 54 by a coupling arrangement 82 which maintains the sheet 54 in a substantially planar form to establish the substantially opaque area 56. In the preferred construction, frame 80 includes four frame members 84 arrayed in a rectangular pattern having four corners 86, the frame members 84 being captured within a rectangular pocket 90 which extends around the perimeter 92 of the curtain panel 52. The frame members 84 are substantially stiff and are connected together at the corners 86 by connectors 94. The connectors 94 are resiliently flexible and are arranged to bias the frame members 84 into the rectangular pattern which, in turn, maintains the sheet 54 in the substantially planar form. Connectors 94 are shown in the form of resiliently flexible spring segments 96 joined to adjacent frame members 84 at corners 86. Spring segments 96 can be in the form of torsion bars, helical springs, or the like, either integrated with the frame members 84 or formed unitary with the frame members 84. Each curtain panel 52 is affixed to a next-contiguous curtain panel 52 by an interposed hinge 100 which enables the several curtain panels 52 of aquarium curtain 50 to be folded, in an accordion-like fashion, with adjacent curtain panels 52 overlapping one-another in a fanfold arrangement. Each hinge 100 preferably is in the form of a sewn seam 110 such that all of the curtain panels 52 are integrated into a single aquarium curtain 50, here illustrated as having four serially-extending curtain panels 52.

Figure 6:
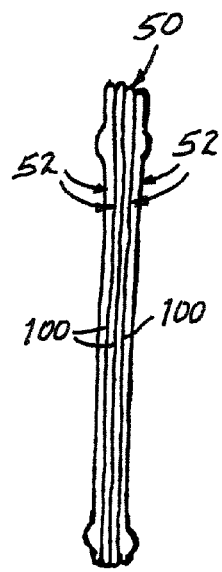
FIG. 6 is an elevational view showing the aquarium curtain in a folded configuration.

With further reference to FIGS. 6 through 12, the frame members 84 of each curtain panel 52 are movable relative to one-another between a configuration wherein each curtain panel 52 is erect, as shown in FIGS. 1 through 6, and a compact, collapsed configuration wherein the curtain panels 52 are folded upon one-another and the aquarium curtain 50 is fully collapsed for compact handling and storage. In order to be placed in the fully collapsed configuration, the curtain panels 52 are first folded accordion-like about respective hinges 100 into an overlapping fanfold arrangement, as seen in FIG. 6. Then all of the curtain panels 52 are collapsed, as depicted in connection with FIGS. 7 through 12. For illustrative purposes, only a single frame 80 is shown and is illustrated without a corresponding sheet 54 (except in FIGS. 11 and 12, wherein sheets 54 are shown in phantom) in a diagrammatic depiction of the movements of frame members 84 as the fan-folded curtain panels 52 are collapsed simultaneously. By grasping opposite frame members 84, as illustrated diagrammatically in FIGS. 7 and 8 by frame members 84-1 and 84-2, and turning the opposite frame members 84-1 and 84-2 in opposite directions about a transverse axis T, as depicted in FIGS. 7 and 8, connectors 94 will be flexed and frame members 84-3 and 84-4 will be moved, along with frame members 84-1 and 84-2, through a partially collapsed stage, as depicted in FIGS. 9 and 10, toward a mutual alignment of all four frame members 84 along a diagonal 120 which extends between diagonal corners 86. Then, as seen in FIGS. 11 and 12, the frame reaches a fully collapsed configuration wherein the frame members 84 are placed side-by-side and sheet 54 (not shown in FIGS. 7 through 10, and shown in phantom in FIGS. 11 and 12) is folded into a compact form for ease of handling and storage of the corresponding collapsed curtain panel 52 and, consequently, aquarium curtain 50. When it is desired to erect aquarium curtain for use, frame members 84 merely are released, enabling connectors 94 to bias frame members 84 into the rectangular erect configuration, and sheets 54 are placed in substantially planar form, for attachment of aquarium curtain 50 to aquarium 10.

In the illustrated embodiments, each curtain panel 52 has a generally square configuration when erect, the square configuration being complementary to the generally square configuration of each side wall 16. The front wall 12 of aquarium 10 has a generally rectangular configuration extending over a longitudinal length between laterally-extending side walls 16, the longitudinal length being substantially twice the lateral extent of the side walls 16. Accordingly, aquarium curtain 50 includes two curtain panels 52 for being juxtaposed with the front wall 12, while one curtain panel 52 is juxtaposed over each side wall 16. It will be apparent that any number of curtain panels 52 may be employed to selectively cover all of the aquarium walls which require covering, and the number of curtain panels may be incorporated into a single aquarium curtain 50 for ease of handling and storage. However, it is advantageous to construct every curtain panel 52 with substantially the same configuration and with substantially the same dimensions so as to facilitate moving all of the folded curtain panels 52 into the fully collapsed configuration, as described above in connection with FIGS. 7 through 12. Thus, in the illustrated embodiment, aquarium 10 has a longitudinal length between side walls 16 which is twice the lateral width between the front wall 12 and the back wall 14, and aquarium curtain 50 includes two curtain panels 52 for juxtaposition with front wall 12 while one curtain panel 52 is juxtaposed with each side wall 16. In this manner, multiple curtain panels 52 are provided with substantially the same configuration and substantially the same dimensions for attaining the desired fanfold arrangement which facilitates the fully collapsed configuration set forth above. Likewise, each frame 80 advantageously is provided with substantially the same configuration and substantially the same dimensions. Aquarium curtain 50 is available for ready deployment and selective placement over an aquarium whenever it is determined that display of the community within the aquarium is not necessary, thereby providing a simple and economical way of inhibiting the growth of algae. Deployment and placement is accomplished easily, and without the necessity for special tools or skills. In addition, aquarium curtain 50 is placed without startling inhabitants of the aquarium community, and once in place, militates against startling of the inhabitants. Further, with the aquarium curtain 50 in place upon aquarium 10, there is less likelihood that the inhabitants will jump out of the aquarium, and that people or pets will invade the aquarium community, or foreign materials will fall into or be thrown into the aquarium 10. Moreover, while aquarium curtain 50 is in place over aquarium 10, the transparent walls 12 and 16 are protected against scratching or otherwise marring of the surfaces covered by the aquarium curtain 50.

It will be seen that the present invention attains all of the objects and advantages summarized above, namely: Provides a simple and effective apparatus for inhibiting the growth and proliferation of algae in an aquarium, and does so without invading the aquarium itself; inhibits the growth of algae in an aquarium without startling or otherwise disturbing the inhabitants of the aquarium or exposing the inhabitants to dangerous, or even toxic, chemicals; requires only minimal time and effort to put into regular use for effectively inhibiting the growth of algae in an aquarium; provides a relatively simple and inexpensive apparatus which can be used conveniently in a method that requires no special tools or skills to accomplish the inhibition of algae growth in an aquarium; is adapted for ready and effective use in connection with a wide variety of aquariums placed in various settings; provides an apparatus which is stored easily when not in use and readily deployed for regular use in effectively inhibiting the growth of algae in an aquarium; provides a rugged apparatus of simplified construction capable of economical manufacture and exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. In combination with an aquarium having aquarium walls, an aquarium curtain for selective deployment and placement over at least one wall of the aquarium to block the entry of ambient light from outside the aquarium to inside the aquarium through a predetermined transparent area of the one wall, thereby inhibiting the growth of algae in the aquarium, the aquarium curtain comprising:
   a sheet of flexibly foldable material having a substantially opaque area complementary to the predetermined transparent area of the aquarium wall;
   a frame having frame members movable relative to one-another between a collapsed configuration and an erect configuration;
   a coupling arrangement coupling the frame with the sheet such that with the frame members in the collapsed configuration the sheet is folded into a compact form for handling and storage, and upon moving the frame members into the erect configuration, the sheet is deployed into a substantially planar form to establish a curtain panel in which the substantially opaque area is placed for juxtaposition with the predetermined transparent area of a corresponding wall of the aquarium; and
   at least one fastener on the curtain panel for selective attachment of the curtain panel to the aquarium in juxtaposition with the corresponding wall, with the substantially opaque area placed over the predetermined transparent area to block the entry of ambient light from outside the aquarium into the aquarium through the corresponding wall of the aquarium, wherein the frame includes four frame members arrayed in a rectangular pattern having four corners when in the erect configuration, and a resiliently flexible connector at each corner connecting corresponding adjacent frame members such that the frame members are biased by the connectors into the erect configuration, and are movable into the collapsed configuration by folding the frame to place the frame members substantially side-by-side along a diagonal extending from corner to corner of the frame.

2. The aquarium curtain of claim 1 wherein the at least one wall extends from a bottom edge upwardly to a top edge, the curtain panel extends from a basal edge upwardly to an uppermost edge, the curtain panel including a supplemental substantially opaque area adjacent the uppermost edge for extending upwardly beyond the top edge of the wall upon attachment of the curtain panel in juxtaposition with the wall, with the basal edge juxtaposed with the bottom edge of the wall, for blocking ambient light from entering the aquarium over the top edge of the wall.

3. The aquarium curtain of claim 1 wherein the at least one wall extends from a bottom edge upwardly to a top edge, the curtain panel extends from a basal edge to an uppermost edge, the curtain panel including a supplemental substantially opaque area adjacent the uppermost edge for extending upwardly beyond the top edge of the wall upon attachment of the curtain panel in juxtaposition with the wall, with the basal edge juxtaposed with the bottom edge of the wall, for blocking ambient light from entering the aquarium over the top edge of the wall.

4. The aquarium curtain of claim 1 wherein the at least one fastener includes a magnet for selectively attaching the aquarium curtain in place over the aquarium walls and detaching the aquarium curtain from the aquarium walls.

5. In combination with an aquarium having aquarium walls, an aquarium curtain for selective deployment and placement over at least one wall of the aquarium to block the entry of ambient light from outside the aquarium to inside the aquarium through a predetermined transparent area of the one wall, thereby inhibiting the growth of algae in the aquarium, the aquarium curtain comprising:

a sheet of flexibly foldable material having a substantially opaque area complementary to the predetermined transparent area of the aquarium wall;

a frame having frame members movable relative to one-another between a collapsed configuration and an erect configuration;

a coupling arrangement coupling the frame with the sheet such that with the frame members in the collapsed configuration the sheet is folded into a compact form for handling and storage, and upon moving the frame members into the erect configuration, the sheet is deployed into a substantially planar form to establish a curtain panel in which the substantially opaque area is placed for juxtaposition with the predetermined transparent area of a corresponding wall of the aquarium; and at least one fastener on the curtain panel for selective attachment of the curtain panel to the aquarium in juxtaposition with the corresponding wall, with the substantially opaque area placed over the predetermined transparent area to block the entry of ambient light from outside the aquarium into the aquarium through the corresponding wall of the aquarium, wherein the aquarium walls include a front wall and side walls, and the aquarium curtain includes a front curtain panel and side curtain panels, each constructed in accordance with the one curtain panel for juxtaposition with a corresponding aquarium wall, and hinges between adjacent curtain panels for enabling the curtain panels to be overlapped with one-another upon removal of the aquarium curtain from the aquarium, and prior to folding corresponding frames into the collapsed configuration.

6. The aquarium curtain of claim 5 wherein all of the curtain panels have substantially the same configuration and substantially the same dimensions.

7. The aquarium curtain of claim 6 wherein the aquarium walls include two side walls and the aquarium curtain includes two corresponding side curtain panels.

8. The aquarium curtain of claim 7 wherein the side walls each have a predetermined width, the front wall extends between the side walls along a predetermined length greater than the predetermined width, and the aquarium curtain includes at least two front curtain panels placed serially between the two side curtain panels for juxtaposition with the front wall.

9. The aquarium curtain of claim 5 wherein the frame of each curtain panel includes four frame members arrayed in a rectangular pattern having four corners when in the erect configuration, and a resiliently flexible connector at each corner connecting corresponding adjacent frame members such that the frame members are biased by the connectors into the erect configuration, and are movable into the collapsed configuration by folding the frame to place the frame members side-by-side along a diagonal extending from corner to corner of the frame.

10. The aquarium curtain of claim 9 wherein all of the curtain panels have substantially the same configuration and substantially the same dimensions, and all of the frames have substantially the same configuration and substantially the same dimensions.

* * * * *